(12) United States Patent
McCarthy et al.

(10) Patent No.: US 6,306,942 B1
(45) Date of Patent: Oct. 23, 2001

(54) LOW TEMPERATURE THERMALLY ACTIVATED WATER-DISPERSED ADHESIVES

(75) Inventors: Arianne E. McCarthy; Terry J. Rayner, both of London (CA)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/543,463

(22) Filed: Apr. 5, 2000

(51) Int. Cl.$^7$ ................. C08J 5/10; C08K 5/29; C08L 75/00
(52) U.S. Cl. .................. 524/195; 524/175; 524/204; 524/217
(58) Field of Search .................. 524/195, 175, 524/204, 217

(56) References Cited

U.S. PATENT DOCUMENTS

| | | |
|---|---|---|
| 4,130,528 | 12/1978 | Chen . |
| 4,250,070 | 2/1981 | Ley et al. . |
| 4,342,843 | 8/1982 | Perlinski et al. . |
| 4,424,642 * | 1/1984 | Stubler et al. ................ 43/114 |
| 4,463,110 | 7/1984 | Perlinski et al. . |
| 4,485,200 | 11/1984 | Perlinski et al. . |
| 4,820,863 | 4/1989 | Taylor et al. . |
| 4,855,001 | 8/1989 | Damico et al. . |
| 4,931,494 | 6/1990 | Auchter et al. . |
| 5,008,363 | 4/1991 | Mallon et al. . |
| 5,047,588 | 9/1991 | Taylor . |
| 5,051,474 | 9/1991 | Warren et al. . |
| 5,081,173 | 1/1992 | Taylor . |
| 5,108,653 | 4/1992 | Taylor . |
| 5,176,777 | 1/1993 | Guilhem . |
| 5,543,455 | 8/1996 | Shah . |
| 5,574,083 | 11/1996 | Brown et al. . |
| 5,608,000 | 3/1997 | Duan et al. . |
| 5,610,232 | 3/1997 | Duan et al. . |
| 5,624,758 * | 4/1997 | Maksymkiw et al. ............ 428/423.1 |
| 5,652,288 * | 7/1997 | Wood et al. ................ 524/371 |
| 5,652,299 | 7/1997 | Nakajima et al. . |
| 5,703,158 | 12/1997 | Duan et al. . |
| 5,717,025 | 2/1998 | Maksymkiw et al. . |
| 5,721,302 | 2/1998 | Wood et al. . |
| 5,739,201 | 4/1998 | Ugai et al. . |
| 5,777,029 | 7/1998 | Horrion et al. . |
| 5,804,672 | 9/1998 | Bolte et al. . |
| 5,821,294 * | 10/1998 | Perlinski ................ 524/507 |
| 5,821,297 | 10/1998 | Arnold et al. . |
| 5,837,089 | 11/1998 | Magrum . |
| 5,840,823 | 11/1998 | Licht et al. . |
| 5,872,182 | 2/1999 | Duan et al. . |
| 5,905,113 | 5/1999 | Licht et al. . |
| 5,916,960 | 6/1999 | Lum et al. . |

FOREIGN PATENT DOCUMENTS

| | | |
|---|---|---|
| 2121959 | 10/1994 | (CA) . |
| 261085 | 1/1989 | (CS) . |
| 1 917 236 | 11/1970 | (DE) . |
| 39 17 306 | 12/1990 | (DE) . |
| 39 33 204 | 4/1991 | (DE) . |
| 197 27 029 | 1/1999 | (DE) . |
| 0 451 998 | 10/1991 | (EP) . |
| 0 936 249 A1 | 8/1999 | (EP) . |
| 2 124 239 | 2/1984 | (GB) . |
| 50-3444 | 1/1975 | (JP) . |
| 50-3446 | 1/1975 | (JP) . |
| 50-22044 | 3/1975 | (JP) . |
| 58-21470 | 2/1983 | (JP) . |
| 60-36543 | 2/1985 | (JP) . |
| 60-255875 | 12/1985 | (JP) . |
| 61-283541 | 12/1986 | (JP) . |
| 1-129083 | 5/1989 | (JP) . |
| 2-20585 | 1/1990 | (JP) . |
| 2-127491 | 5/1990 | (JP) . |
| 4-164986 | 6/1992 | (JP) . |
| 4-323292 | 11/1992 | (JP) . |
| 8-199149 | 8/1996 | (JP) . |
| 8-302315 | 11/1996 | (JP) . |
| 10-195406 | 7/1998 | (JP) . |
| 10-273587 | 10/1998 | (JP) . |
| 11130913 | 5/1999 | (JP) . |
| 11-151794 | 6/1999 | (JP) . |
| 278 615 | 11/1997 | (SL) . |
| 480259 | 6/1978 | (SU) . |
| 852907 | 8/1981 | (SU) . |
| WO 92/02568 | 2/1992 | (WO) . |
| WO 94/13703 * | 6/1994 | (WO) . |
| WO 95/19403 | 7/1995 | (WO) . |
| WO 97/19121 | 5/1997 | (WO) . |
| WO 97/32805 | 9/1997 | (WO) . |
| WO 98/33602 | 8/1998 | (WO) . |
| WO 99/14278 | 3/1999 | (WO) . |
| WO 99/14279 | 3/1999 | (WO) . |
| WO 99/26993 | 6/1999 | (WO) . |
| WO 99/48997 | 9/1999 | (WO) . |

OTHER PUBLICATIONS

Technical Data Sheet: "Polyurethane Dispersions, Quilastic", Issue 05, (01/99), Merquinsa, Barcelona, Spain.
Technical Data Sheet: "Quilastic DEP–170 Provisional Data Sheet", Issue 03, (01/99), Merquinsa, Barcelona, Spain.
Technical Data Sheets: Quilastic DEP–172 Provisional Data Sheet, Issue 04, (01/99), Merquinsa, Barcelona, Spain.
Technical Brochure: Neoprene polychloroprene, "Basic Compounding of Neoprene Latex", NL–310.1, ADH–220.2, (9/96) 300609A, DuPont Dow Elastomers, Wilmington, DE.

(List continued on next page.)

Primary Examiner—James J. Seidleck
Assistant Examiner—U. K. Rajguru
(74) Attorney, Agent, or Firm—Scott A. Bardell

(57) ABSTRACT

The invention provides low temperature thermally activatable water-dispersed adhesive compositions and adhesives made therefrom. The adhesive compositions comprise a mixture of low modulus crystallizing polyester polyurethane, acrylic ester copolymer, thermoplastic resin, one or more hydrophobically-modified associative polyurethanes, and a stabilizer system comprising a combination of carbodiimide and branched primary amino alcohol.

14 Claims, No Drawings

OTHER PUBLICATIONS

Technical Brochure: "Urethane Additives Package", Rhein Chemie Corporation.
Technical Data Sheet: "HRJ–12573", UT01750 (6/99), Schenectady International Inc., Schenectady, NY.
Technical Data Sheet: HRJ–13130, UMO1630RI (2/95), Schenectady International Inc., Schenectady, NY.
Technical Data Sheet: "Durite AL 3029C", TDS AL, 3029C, (02/99), Borden Chemical—Canada.
Technical Data Sheet: "Durite AL 8405C", TDS AL, 8405C (10/93), Borden Chemical—Canada.
Technical Data Sheets: BASF Introduces: Luphen Polyester Urethane D DS 3507 For Technical Dry Bonding Applications, *Luphen D DS 3507*, BASF Charlotte Technical Center, Charlotte, NC, Presented Feb. 1999.
Technical Brochure: "Dispercoll for the manufacture of adhesives", Bayer, pp. 1–17.
Technical Data Sheets: "DRT—resin dispersions for water-based adhesives", Les Dérivés Résiniques & Terpéniques S.A.
Technical Data Sheet: "Dermulsene DT 50" (May 10, 1998), Les Dériv''s Résiniques & Terpéniques S.A.
Technical Data Sheets: "Demulsene® in water based contact adhesives for foam bonding" applications, (Apr. 1999), Les Dérivés Résiniques & Terpéniques S.A.
Technical Data Sheets: "Hercules Chemical Specialties Product Data, Piccotex® LC–55WK Anionic, Pure Monomer Resin Dispersion", (Jul. 24, 1996), Hercules Incorporation, Wilmington, DE.
Technical Brochure: Tacolyn 5001 Resin Dispersion (Res A–2496), Hercules Chemical Specialties.
Juhasz et al., "Thermal study of chlorine–containing polymers. I. Direct determination of the 1,2–units of polychloroprenes by thermal dehydrochlorination," Muanyag es Gumi (1968), 5(10), pp. 381–385 (Eng. Abs.).
Technical Data Sheet: "Primary Amino Alcohols", TDS 10, (1998), Angus Chemical Company, Buffalo Grove, IL.
Technical Data Sheet: "AquaStik™ 1120", (1/97) 248348A, DuPont Dow Elastomers, Wilmington, DE.
Technical Data Sheet: "AquaStik™ Selection Guide", (7/96) 248347A, DuPont Dow Elastomers, Wilmington De.
Technical Data Sheet: "AquaStik™ 2540", DuPont Dow Elastomers, Wilmington, DE.
"What is AQR–0033?" (Aug. 14, 1998), DuPont Dow Elastomers, Wilmington, DE (pp. 4–12).
Technical Information: "Adhesive Raw Materials—Acronal® A 310 S", (1996) BASF Corporation, Charlotte, NC.
Abdel–Razik, "Photostabilizing Effect of 5–Hydroxy–3–Phenyl–amino–1–Phenyl–3:5–Dihydrobenzene Derivatives in Polychloroprene," *Journal of Polymer Science: Part A: Polymer Chemistry*, vol. 26, pp. 2359–2367 (1988).
Musch et al., "Polychloroprene Crosslinking for Improved Aging Resistance," *KGK Kautschuk Gummi Kunstoffe* 49, Jahngang, Nr. 5/96.
Al–Mehdawe et al., "Rubber–Bound Antioxidants. I. Amine Antioxidants Bound to Polychloroprene Rubber," *Rubber Chemistry and Technology*, vol. 62, pp. 13–32.
Al–Mehdawe et al. "Rubber Bound Antioxidants. II. Amine Antioxidants Bound with Polychloroprene Rubber," *J. Patrol. Res.*, vol. 7, No. 2 (1988), pp. 99–110.
Amano et al., "Studies on the Stabilization of Chloroprene Rubbers Part I Thermal Dehydrochlorination Studies by the pH Method,"*UDC*, 678, 763:66, 081, pp. 45–50.
Gardner et al., "The Thermal Degradation of Polychloroprene–I/Thermal Analysis Studies of the Stability of Polychloroprene Samples, and Measurements of the Kinetics of Degradation," *European Polymer Journal*, 1971, vol. 7, pp. 569–591.
Karagezyan et al., Kozh–Obuvn. Prom–st. (1997) (2), pp. 35–36 (Eng. Abs.).
Ogandzhanyan et al., Arm. Khim. Zh. (1977), 30(6), pp. 458–464 (Eng. Abs.).
Ordukhanyan et al., Arm. Khim. Zh. (1988), 41(3), pp. 142–146 (Eng. Abs.).
Boshnyakova et al., Plast. Massy (1976), (8), pp. 41–42 (Eng. Abs.).
Oganesyan et al, Prom. Sin. Kauch. Nauch.–Tekh. Sb. (1969), No. 7 pp. 9–12 (Eng. Abs. Only).
Karapetyan et al, Prom. Sin. Kauch., Nauch.–Tekh. Sb. (1969), No. 4, pp. 12–14 (Eng. Abs. Only).
Kleps et al., "Investigation of the Influence of Metal Oxides on the Thermal Degradation of Chlorine–Containing Polymers by Thermogravimetry," *Journal of Thermal Analysis*, vol. 32 (1987), pp. 1785–1789.
Kleps et al., "Investigation of the Influence of Zinc Oxide on Thermal Degradation of Olychloroprene," *Journal of Thermal Analysis*, vol. 36 (1990), pp. 1213–1221.

* cited by examiner

LOW TEMPERATURE THERMALLY ACTIVATED WATER-DISPERSED ADHESIVES

FIELD OF THE INVENTION

This invention relates to water-dispersed adhesive compositions and particularly to water-dispersed adhesive compositions that form adhesives that can be thermally activated at low temperatures.

BACKGROUND OF THE INVENTION

In the manufacture of office or automobile seating, a fabric is typically bonded to a contoured foam surface. The cloth-covered foam may then also be bonded to a support material such as wood or plastic. The contoured foam is typically bonded to the fabric by an adhesive. The adhesive may be applied when the part is needed or may be applied, allowed to dry, and then bonded at a later time depending upon the characteristics of the particular adhesive.

Adhesives such as sprayable hot melts, solvent-based adhesives, and water-based contact adhesives have been used for such applications. Sprayable hot melt adhesives typically require specialized spray and storage equipment and have a short open time. Hot melt adhesives may also require re-heating at relatively high temperatures, for example 350° F. (177° C.) to re-melt the adhesive and form a bond. Solvent-based adhesives are available with a wide range of solvated polymers, including crystallizing polyurethanes. However, the use of materials containing organic solvents in the workplace has raised emission and exposure concerns. Water-based contact adhesives containing polychloroprene typically have a short open time, for example, not more than about 4 hours. Such water-based adhesives also tend to release chlorine over time which can be detrimental to the fabric bonded to the foam core. Additionally, some contact-adhesives are fast breaking dispersions which require immediate bond formation after application and may require moderate pressure (>3 psi (>0.14 kPa)) to effect a bond. Water-based contact adhesives also tend to exhibit auto adhesion, which prevents stacking of adhesive-coated parts.

SUMMARY OF THE INVENTION

In one aspect, the present invention provides adhesive compositions which comprise low temperature thermally activatable water-dispersed adhesive composition comprising low modulus crystallizing polyester polyurethane, acrylic ester copolymer, thermoplastic resin selected from the group consisting of terpene-phenolics, resin esters, acrylate-acrylonitrile copolymers, acrylate-styrene-acrylonitrile terpolymers, and combinations thereof, one or more hydrophobically-modified associative polyurethanes, and a stabilizer system comprising a combination of carbodiimide and branched primary amino alcohol.

In another aspect, the invention provides adhesives made from the adhesive compositions described in this application.

The term "water dispersed" means that the carrier is primarily water. However, incidental organic solvents, such as those present in additives and commercially available components, may be present. Thus, the adhesive compositions of the invention are at least substantially free of organic solvents. Preferably, however, "water-dispersed" refers to a 100% water carrier.

The adhesive compositions or the adhesives of the invention contain no external plasticizer or zinc oxide. The adhesive compositions of the invention also preferably contain no polychloroprene resins, latexes, or dispersions.

The term "plasticizer", as used herein, means compounds from the following classes: phthalates including alkyl benzyl phthalates; adipates including dialkyl adipates; phosphates including alkyl aryl phosphates and triaryl phosphates; alkyl and aryl sulfonamides, and hydrogenated terphenyls.

The term "low temperature thermally activatable adhesive" means adhesives of the invention that are capable of bonding substrates at a bondline temperature of as low as 109° F. (43° C.).

The term "low modulus" means a storage modulus (G') not more than $3 \times 10^6$ dynes/cm$^2$ at 60° C., and preferably not more than $1 \times 10^9$ dynes/cm$^2$ at 20° C., as measured by dynamic mechanical analysis (DMA) at a frequency of 1 Hertz.

The term "crystallizing polyester polyurethane" means a polyester polyurethane polymer that has at least one measurable glass transition temperature (Tg) above 68° F. (20° C.) as by measured by DMA.

The term "adhesive composition" means a mixture of adhesive components dispersed in water. The term "adhesive" means a mixture of adhesive components wherein water has been removed.

Adhesives of the invention after coating onto a substrate are also non-blocking.

Adhesives of the invention also have a long open time, that is, the adhesives of the invention can be bonded more than 24 hours after drying (non-blocking). Adhesives of the invention can also be bonded at low pressures, that is, pressures on the order of 1–3 psi (0.048–0.14 kPa) are required to effect a bond having adequate strength.

Other advantages of the adhesive compositions of the invention include the adhesive compositions are sprayable, they provide high green strength environmentally resistant bonds, and the adhesive compositions of the invention have low penetration into porous surfaces.

DETAILED DESCRIPTION OF THE PREFERRED EMBODIMENTS

The water-dispersed adhesive compositions of the invention comprise one or more low modulus crystallizing polyester polyurethanes, acrylic ester copolymer, thermoplastic resin, hydrophobically-modified associative polyurethane, and a stabilizer system. The water-dispersed adhesive compositions optionally, but preferably contain one or more antioxidants.

Acrylic ester copolymer is generally present in the adhesive compositions of the invention in an amount of from 2 to about 15 parts per 100 parts low modulus crystallizing polyester polyurethanes on a dry weight basis, or "phr urethane." Acrylic ester copolymer is preferably present in the adhesive compositions of the invention in an amount of from about 4 to about 12 phr urethane and more preferably present in an amount of from about 6 to about 10 phr urethane.

Thermoplastic resin is present in the adhesive compositions of the invention in an amount of from about 10 to about 30, preferably from about 15 to about 25, and more preferably from about 18 to about 22 phr urethane.

Hydrophobically-modified associative polyurethane is present in the adhesive compositions of the invention in an amount of from about 0.05 to about 3, preferably from about 0.05 to about 2.0, and more preferably from about 0.05 to about 1.0 phr urethane.

The adhesive compositions of the invention contain a stabilizer system. The stabilizer system comprises a combination of carbodiimide and branched primary amino alcohol. Carbodiimide is present in the adhesive compositions of the invention in an amount of from about 1.0 to about 3.0, preferably from about 1.4 to about 2.4, more preferably from about 1.6 to 2.0 phr urethane. Branched primary amino alcohol is present in the adhesive compositions of the invention in an amount from about 1.0 to about 3.0, preferably from about 1.4 to about 2.4, more preferably from about 1.6 to 2.0 phr urethane. Generally, the ratio of carbodiimide to branched primary amino alcohol ranges from about 0.5 to 1 to about 1 to 0.5 by weight with a ratio of about 1 to 1 preferred.

If present, antioxidant is provided in the adhesive composition of the invention in an amount of from about 1.0 to about 3.0, preferably about 1.4 to about 2.5, more preferably about 1.6 to about 2.2 phr urethane.

The adhesive compositions of the invention contain one or more low modulus crystallizing polyester polyurethanes, preferably in the form of a water dispersion. The low modulus crystallizing polyester polyurethane provides the adhesives of the invention with high hot tack, a rapid crystallization rate resulting in high green strength, a high solids content (50–60%), an extended bond range capability (up to four days), and moderate heat resistance. The low modulus crystallizing polyester polyurethane can either be carboxylated or sulfonated, but is preferably carboxylated. Low modulus crystallizing polyester polyurethanes can be generally made by methods described in PCT Publication WO 99/26993. Useful low modulus crystallizing polyester polyurethanes include those having the trade designations Dispercoll™ KA-8756 (Bayer, Pittsburgh, Pa.) (G' @ 25° C. ~1×10$^9$, @ 60° C.~1×10$^6$, @ 80° C.~9×10$^5$ dynes/cm$^2$); Neocryl™ 9617 (Neoresins Division of Avecia Inc.) (G' @ 25° C.~1×10$^8$, @ 60° C.~1×10$^6$, @ 80° C.~9×10$^5$ dynes/cm$^2$); and Quilastic™ DEP 170 (G' @ 25° C.~1×10$^9$, @ 60° C.~1×10$^6$, @ 80° C.~7×10$^5$ dynes/cm$^2$) and Quilastic™ DEP 172 (Merquinsa) (G' @ 25° C.~1×10$^9$, @ 60° C.~2×10$^6$, @ 80° C.~2×10$^6$ dynes/cm$^2$). All of the above storage modulus values are measured values by DMA at a frequency of 1 Hertz.

The acrylic ester copolymer enhances hot tack properties of the adhesive and acts as a compatibilizer for the low modulus crystallizing polyester polyurethane and the stabilizer system and other resins. Useful acrylic ester polymers have a rubbery plateau modulus where the storage modulus (G') is not more than 8×10$^5$ dynes/cm$^2$ at 80° C. and 1×10$^6$ dynes/cm$^2$ at 50° C. and are preferably anionic. General teachings of how such acrylic ester polymers are made can be found in U.S. Pat. Nos. 4,250,070 and 4,931,494, incorporated by reference herein. Commercially available acrylic ester copolymers useful in the water-dispersed adhesive compositions of the invention include Acronal® A 310 S (butyl acrylate/methyl methacrylate copolymer; Tg: −20° C.) and Acronal® A 311 S (butyl acrylate/methyl methacrylate copolymer; Tg: −20° C.), available from BASF Corporation. The above commercially available acrylic ester copolymers are believed to be derived from a copolymer of butyl acrylate and methyl methacrylate and crosslinked with a hydrazine derivative, for example, a dihydrazide, when the copolymer is dried.

The thermoplastic resin enhances the cohesive strength, product stability, and wetting properties of the adhesive. The selection of a particular thermoplastic resin for use in the adhesive compositions of the invention is dependent upon compatibility and stability with the low modulus crystallizing polyester polyurethane, desired activation temperature, strength requirement both green strength and ultimate strength, and the surface tension of the substrates. Useful thermoplastic resins of the invention have a glass transition temperature (Tg) of 0° C. and greater. Useful classes of thermoplastic resins include terpene-phenolics, rosin esters, acrylate-acrylonitrile copolymers, acrylate-styrene-acrylonitrile terpolymers, and combinations thereof, preferably in the form of water dispersions.

Examples of terpene-phenolics include polyterpene resins from poly-alpha-pinene, poly-limonene, and poly-beta-pinene. Preferred terpene phenolic resins have a softening point of about 40° C.–85° C., more preferably 50° C., as measured by Ring and Ball Softening Point (ASTM E-28-92). Useful rosin esters include modified rosin esters, hydrogenated rosin esters, polymerized rosin esters, acid-modified rosin esters, dark rosin esters, and liquid rosin esters. The rosin source may be derived from any of wood rosin, tall oil rosin, or gum rosin. Typical descriptions of useful rosin esters include: methyl ester of wood rosin, hydroabietyl alcohol of gum rosin, hydrogenated methyl ester of wood rosin, triethylene glycol (TEG) ester of partially hydrogenated wood rosin, glycerol ester of wood rosin, pentaerythritol (PE) ester of tall oil rosin or PE ester of tall oil rosin, glycerol ester of partially dimerized rosin, PE ester of partially hydrogenated wood rosin, glycerol ester of gum rosin, and PE ester of modified wood rosin. Commercially available thermoplastic resins that are useful in the adhesive compositions of the invention include those having the trade designations DS 3390 (acrylate-acrylonitrile copolymer) and S-504 (acrylate-styrene-acrylonitrile terpolymer) (BASF) and Rhoplex™ CA-597 (butyl acrylate/acid component; Tg 5° C.) (Rohm and Haas); XR-4257 (resin ester) (Arizona Chemical); and Dermulsene™ DT50 (terpenephenolic).

The hydrophobically-modified associative polyurethanes of the adhesive compositions of the invention provide a means of formulating to provide rapid recovery from shear thinning after application of the adhesive composition to a substrate. Hydrophobically-modified associative polyurethanes are added to the adhesive compositions, preferably in the form of a dispersion, so to preferably provide adhesive compositions having near Newtonian flow characteristics. An effective amount of a hydrophobically-modified associative polyurethane is that amount which provides an adhesive composition of the invention with near Newtonian flow characteristics. HEUR (hydrophobically modified ethylene oxide-based urethane resins, a class of hydrophobically-modified polyurethane) perform independent of adhesive composition pH. The hydrophobe groups interact with the dispersed polymer particles and resin particles that are present in the adhesive compositions of the invention to form weak associative complexes with other hydrophobe groups at the surface of the dispersed polymer particles. Some HEUR are capable of imparting near-Newtonian rheology. Commercially available hydrophobically-modified associative polyurethanes (in the form of a dispersion) include those having the tradenames Nopco™ DSX 1514 and 1550 (Henkel Corporation) and Acrysol™ RM-825, RM 1020, RM 8W (Rohm and Haas).

The adhesive compositions of the invention contain an effective amount of a stabilizer system. An "effective amount" of a stabilizer system means an amount of stabilizer system so to minimize drift in pH below a pH of about 6.5 to prevent coagulation of the low modulus crystallizing polyester polyurethanes or hydrolysis of any ester moieties of the low modulus crystallizing polyester polyurethanes.

Such hydrolysis may be detected by a major shift in pH of the dispersion and by using analytical techniques such as Fourier Transform Infrared Spectroscopy (FTIR), Gas Chromatography (GC), and mass spectrometry. The stabilizer systems of the adhesive compositions of the invention protects polyester groups in the polyurethane from hydrolysis in the both the adhesive composition and the resulting adhesive. The stabilizer system of the adhesive compositions of the invention comprise a combination of tertiary primary amino alcohol and carbodiimide. The stabilizer may also further comprise an antioxidant.

The branched primary amino alcohols act primarily as acid scavengers. The branched primary amino alcohols are derived from nitroparaffins by way of nitro alcohols. Useful branched primary amino alcohols are those which are miscible in water. Preferred primary amine alcohols include 2-amnino-1-butanol; 2-amino-2-methyl-1,3-propanediol; 2-amino-2-methyl-1-propanol; 2-amino-2-ethyl-1,3-propanediol; and tris(hydroxymethyl)aminomethane.

A carbodiimide, as used herein, is a compound containing the functional group: —N=C=N—. The carbodiimides are useful for preventing hydrolysis of functional groups such as ester groups. The carbodiimides may be aliphatic or aromatic. Useful carbodiimides are either miscible or dispersible in water. Preferred carbodiimides are those that are sterically hindered, water miscible, and contain little or no organic solvent. Preferred carbodiimides include Stabaxol® P 200 (reaction product of tetramethylxylene diisocyanate; water-dispersed), Stabaxol® P (poly(nitrilomethanetetraylnitrilo (2,4,6-tris(1-methylethyl)-1,3-phenylene)), and Stabaxol® I (tetraisopropyldiphenylcarbodiimide) (RheinChemie) and Ucarlnk® D XL-29SE (Union Carbide, Danbury, Conn.). Both Stabaxol® P and I are useful in the compositions of the invention if first dispersed in water.

The adhesive compositions of the invention preferably, but optionally, contain one or more antioxidants. Useful antioxidants include Octolite™ 640, a 55% solids by weight emulsion blend 50:50 by weight of a polymeric hindered phenol and a thioester; Octolite™ 561, a 50% solids by weight dispersion of 4,4'-butylidenebis (6-t-butyl-m-cresol); Octolite™ 544, a 55% solids by weight dispersion of N,N'-di-beta-napthyl-p-phenylenediamine; Octolite™ 504, a 50% solids by weight dispersion of 2,2'-methylenebis(6-t-butyl-p-cresol); Octolite™ 485 (a 46% solids by weight dispersion of Bisphenol antioxidant, an anionic emulsion of Uniroyal's Naugawhite Liquid); Octolite™ 424, a 63% solids by weight emulsion blend 50:50 by weight of a polymeric hindered phenol and di-tridecylthiodipropionate (DTDTDP) thioester; Octolite™ AO-50, a 50% solids by weight emulsion of a hindered phenol and DTDTDP thioester; Octolite™ AO-28, a 63% solids by weight emulsion blend 80:20 of a polymeric hindered phenol and DTDTDP thioether; and Octolite™ WL, a 50% solids by weight emulsion of butylated reaction product of para-cresol and dicyclopentadiene, all available from Tiarco Chemical Division, Textile Rubber and Chemical Company, Inc., Dalton, Ga.

The thermal resistance of the adhesives of the invention may be further increased by adding one or more water-dispersed or water dispersible isocyanates to the adhesive compositions of the invention. As used herein, "isocyanates" include both blocked and un-blocked isocyanates. Examples of useful isocyanates include Desmodurrm DA, KA 8703, and BL-116 (Bayer, Pittsburgh, Pa.); Trixene™ BI 7986 (Baxenden Chemicals, Baxenden, England); and HD-100 (Lyondell Chemical, Newtown Square, Pa.). Generally, if present, isocyanates may be present in the adhesive compositions at levels of about 1 to about 7.5% by weight of the water based composition, with a level of from 3 to 5% by weight of the composition being preferred. Additionally, the use of water-dispersible dihydrazide containing materials, water-dispersible epoxy resins, and water dispersible silanes may also be used to increase thermal resistance.

The water-dispersed adhesive compositions of the invention may also include one or more additional rheology modifiers to control the flow of the adhesive composition. Useful additional rheology modifiers include alkali soluble or swellable emulsions such as Acrysol™ ASE-60, ASE-75, and ASE-95NP, Acusol™ 810A (Rohm and Haas, Philadelphia, Pa.) and Alcogum™ L-15, L-131, and L-37 (Alco Chemical, Chattanooga, Tenn.), alkali soluble associative emulsions such as Alcogum™ SL-70, and 78 (Alco Chemical) or Acrysol™ TT-935 or RM-5 (Rohm and Haas), and alkali swellable associative urethanes such as Polyphobe™ P-104, and P-106 (Union Carbide, Cary, N.C.), and combinations thereof.

Pigments may be added to color the adhesive compositions. Suitable pigments are available as powders, which are water dispersible, or as aqueous dispersions. Some suitable pigments include Phthalocyanine green and Phthalocyanine blue pigment aqueous dispersion (Hilton Davis Chemical Co., Cincinnati, Ohio), Akrosperse™ Calcium 2B red aqueous dispersion (Akrochem Corporation, Akron, Ohio), and Carbon Black™ aqueous dispersion (Technical Industries Inc., Peace Dale, R.I.), and combinations thereof.

The adhesive compositions of the invention may also contain other conventional additives such as adhesion promoters. A preferred silane adhesion promoter is Silques™ Coatosil™ 1770 (beta-(3,4-epoxycyclohexy)ethyltriethoxysilane) or Silques™ Y-15078 (gamma-glycidoxypropylmethyldiethoxysilane), both available from CK Witco Corporation, Tarrytown, N.Y.

The adhesive compositions can be made by combining the ingredients with mixing at room temperature as is well known by one skilled in the art. Normally, low shear mixing equipment can be used.

The adhesive compositions of the invention can be applied to one or both surfaces of the substrates to be bonded. The preferred adhesive compositions are preferably applied to a substrate by spraying. However, adhesive compositions of the invention may also be applied by conventional means, such as brush, paint roller, or roll coater provided that the adhesive composition has the appropriate viscosity. The adhesive compositions of the invention may also be applied to release liners and dried to form self-supporting films which can be further die-cut into specific shapes if desired. Adhesive compositions of the invention may be dried at room or elevated temperatures, for example, by using an air circulating oven or infrared heaters.

In commercial practice, the adhesive of the invention is applied to the substrate then dried, then allowed to stand for a period of time before being used. To form the bond, the adhesive coated substrate is brought into contact with the other substrate to be bonded and light pressure is applied to the back of the adhesive-coated substrate. The substrate is then heated such that the adhesive is heated to a bondline temperature of at least 43° C. Heat may be applied to the adhesive/substrate combination by any means such as hot press, heat gun, heat lamps, oven, conformable heated fluidized bed such as a waterbed or bed of flowable particles, heated bladder press, or a steam press. The bonded assembly is held in place for about 25–45 seconds. Preferably, the bond line temperature as measured is at least 43° C. and more preferably from about 113° F.–120° F. (45° C.–49° C.).

Examples of substrates that can be bonded include open and closed cell foams, wood, metals, fabrics, and plastics. Examples of foams include, polyurethanes, polystyrenes, polychloroprenes, and the like. Specific examples of fabrics include those made from acrylics, vinyls, leathers, cottons, nylons, polyesters, rayons, and the like. Specific plastics include polyvinyl chlorides, acrylonitrile/butadiene/styrenes, high impact polystyrenes, and blends thereof containing for example polycarbonates, and the like.

| Abbreviation | Tradename | Description |
|---|---|---|
| *Index of Abbreviations* | | |
| *Polyester Polyurethane* | | |
| DEP170 | Quilastic ™ DEP 170 | Carboxylated polyester polyurethane dispersion, G' @ 25° C. ~ $1 \times 10^9$, @ 60° C. $1 \times 10^6$, @ 80° C. ~ $7 \times 10^5$ dynes/cm$^2$, available from Merquinsa Corporation, Barcelona, Spain |
| DEP172 | Quilastic ™ DEP 172 | Carboxylated polyester polyurethane dispersion, G' @ 25° C. ~ $1 \times 10^9$, @ 60° C. $2 \times 10^6$, @ 80° C. ~ $2 \times 10^6$ dynes/cm$^2$, available from Merquinsa Corporation, Barcelona, Spain |
| *Acrylic Ester Polymer* | | |
| A310S | Acronal ™ A 310S | Butyl Acrylate/Methylmethacrylate copolymer dispersion with hydrazide functionality, Tg: −20° C., available from BASF Corporation, Toronto, Ontario |
| CA597 | Rhoplex ™ CA-597 | Butyl acrylate/acid component copolymer dispersion, Tg: −5° C., available from Rohm & Haas, Philadelphia, PA |
| *Thermoplastic Resin* | | |
| DT50 | Dermulsene ™ DT50 | Terpene Phenolic resin dispersion, available from DRT, Dax, France |
| *Stabilizer* | | |
| P200 | Stabaxol ™ P 200 | Water-dispersible carbodiimide, available from RheinChemie, Trenton, NJ |
| Trisamino | Tris(hydroxymethyl) aminomethane | Neat, available from Angus Chemical Company, Buffalo Grove, IL |
| *Miscellaneous Additives* | | |
| Ol 640 | Octolite ™ 640 | Antioxidant which is an emulsion blend of 50:50 by weight polymeric hindered phenol and thioester, available from Tiarco Chemical Division, Dalton, GA |
| RM1020 | Acrysol ™ RM-1020 | Hydrophobically-modified associative ethylene oxide polyurethane dispersion, available from Rohm and Haas Company, Philadelphia, PA |
| RM8W | Acrysol ™ RM8W | Hydrophobically-modified associative polyurethane dispersion, available from Rohm and Haas Company, Philadelphia, PA |

EXAMPLES

The invention will be further illustrated by the following examples, which are illustrative of specific modes of practicing the invention, and are not intended as limiting the scope of the appended claims.

Unless otherwise stated, all percentages are percentages by dry weight and those percentages applying to adhesive compositions are by dry weight of the total amount of adhesive component.

Parts per hundred (phr), unless otherwise stated, are also parts per 100 parts of the dry weight of the carboxylated polyurethane component.

Dashes in the Tables indicate that no value was noted or that an ingredient was not present.

Unless otherwise stated, all components were added in the form of dispersions (i.e., in water).

TEST PROCEDURES

Elevated Temperature Stability

This test is intended to give an indication of long-term stability at room temperature of a particular composition by subjecting it to elevated temperature.

A composition of the invention is prepared, sealed in a 60 mL polyethylene bottle that was half filled, and placed in an air-circulating oven at 122° F. (50° C.). After various time intervals, the composition is removed from the oven, conditioned at room temperature for 3 to 4 hours, and tested for pH using an Orion Model 710A pH meter, available from Orion Research Inc., Beverly, Mass.

In addition, the composition is inspected using a wooden applicator stick to see the extent the composition has coagulated, which includes congealed, curdled, separated, settled, or formed non-easily mixable or non-easily dispersible layers. The percent (%) coagulation is estimated by the depth of the wooden applicator stick compared to the total depth of the composition in the bottle. The percent coagulation and elapsed time period is reported. It is preferred that the composition has 0% coagulation for at least 4 weeks.

Room Temperature, T-Peel Strength, Foam to Fabric

In this test, the adhesive strength of a composition is determined for bonded parts of foam to fabric.

A 3 inch×3 inch (7.6 cm×7.6 cm) piece of foam (open cell polyurethane foam, Q41), available from Dickerts of London, London, Ontario, Canada) and a 4 inch×6 inch (10.2 cm×15.2 cm) piece of open weave, polyester blend, acrylic backed fabric (Lansing Ocean, available from Dickerts of London, London, Ontario, Canada) are each evenly sprayed with the adhesive composition to be tested using a Critter spray gun on one surface to a coating weight of 2 to 3 g/0.09 m$^2$ (2 to 3 g/ft$^2$).

The foam and the fabric are allowed to dry at ambient conditions for various times, i.e., open time, (2 hours, 4 hours, 24 hours, or 72 hours). The adhesive coated side of the fabric is then placed on the adhesive coated side of the foam and a hot water bottle, that has been heated to 158° F. (70° C.) for at least two hours, is placed on top of the fabric/foam bonded test assembly and weighted down with a 5 pound (2.3 kg) weight attached to a piece of plastic for approximately 20–25 seconds so that the bondline temperature reaches approximately 113° F. (45° C.). The bondline temperature is measured using Thermolabel™ Temperature Sensitive Tape, available from Paper Thermometer Co. Inc., Greenfield, N.H. The bonded assembly is then conditioned at ambient temperature for 24 hours before hand peeling the fabric from the foam along one side. The bond strength is assigned a rating according to the following:

5 =strong bond; total (>80%) foam tear over the total bonded area

4 =strong bond; partial (1–80%) foam tear

3 =strong bond; no (0%) foam tear

2 =moderate bond; no (0%) foam tear
1 =slight bond; no (0%) foam tear 0 =no bond
The reported value in the Tables is the average of four replicates for each composition/adhesive tested.

T-Peel Strength After Environmental Exposure, Foam to Fabric

In this test, the effectiveness of bonding of a composition/adhesive after exposure to an elevated temperature of 126° F. (52° C.) and 80% Relative Humidity (RH) for 48 hours is determined.

The foam/fabric test assemblies after being used for determining "Room Temperature, T-Peel Strength, Foam to Fabric" above, are utilized for determining T-Peel Strength after exposure to hot, moist conditions.

The bonded test assemblies are put in an environmental chamber at 126° F. (52° C.) and 80% RH for 48 hours. The assemblies are removed from the chamber and conditioned at room temperature for 24 hours.

Each of the test assemblies is then tested using the procedure of the test method "Room Temperature, T-Peel Strength, Foam to Fabric".

Room Temperature, T-Peel Strength, Twill to Twill

In this test, the adhesive strength of a composition is determined for bonded parts of cotton twill to itself.

Two pieces of cotton twill (available from Rosetrim of Toronto, Ontario, Canada) one inch (2.54 cm) wide and approximately 20 inches (50 cm) long are each coated with four (two+two) thin (3–4 g/0.09 m$^2$ dry coating weight) layers of the composition being tested with 10 minutes dry time between the first two coats and the second two coats using a one inch (2.54 cm) wide paint brush. After 1.5 to 2 hours at room temperature, the two pieces are placed in an air circulating oven at 158° F. (70° C.) for 20 minutes. The coated pieces are removed from the oven and immediately mated, coated side to coated side, and rolled down with a steel roller.

The bonded sample is left at room temperature for 4 days. The two free ends of the bonded sample are peeled apart by hand to a point where the adhesive composition covers the total one inch (2.54 cm) width of the twill, the ends are clamped in the jaws of an INSTRON tensile testing machine, and the bonded sample is tested at a separation rate of 2 inches (50 mm) per minute for a distance of about 3.5 inches (8.9 cm).

The force required to peel the two pieces of twill apart is measured as an average force recorded over the bonded area tested. The force is recorded in Newtons per inch width and converted to pounds per inch width (piw) and kilonewtons per meter (kN/m). The reported value in the Tables is the average of two replicates for each composition tested.

Heat Resistance, Twill to Twill

In this test, the effectiveness of bonding of a composition to support a 0.44 pounds (200 grams) weight at elevated temperature is determined.

The twill/twill test samples after being used for determining "Room Temperature, T-Peel Strength, Twill to Twill" above, are utilized for determining heat resistance.

A mark is made on the twill/twill test sample from above to indicate the start/leading edge/position of the bonded area. One free end of the test sample is suspended from a rack in an air circulating oven. A 0.44 pound (200 gram) weight is fastened to the remaining free end of the test sample and the temperature of the oven is set to 104° F. (40° C.). After 1 hour, the bond separation (i.e., the distance that the bond has released) is measured and a second mark is made on the sample to indicate this point as the start of the bonded area for next test segment. The temperature of the oven is increased to 113° F. (45° C.), held constant for 1 hour, and the bond separation is measured from the second mark. A third mark is made on the sample to indicate the start of the bonded area. The test is continued wherein the temperature of the oven is increased in 9° F. (5° C.) increments, holding the temperature constant for 1 hour for each increment, and measuring the bond separation until separation exceeds one inch (25 mm).

The temperature at which the separation of greater than one inch (25 mm) is considered to be the failure temperature for that composition.

Room Temperature, 180° Peel Strengh, Substrate to Twill

In this test, the effectiveness of bonding of a composition is compared for various substrates bonded to cotton twill.

Bonded samples are prepared according to the procedure outlined in "Room Temperature, T-Peel Strength, Twill to Twill" test method above except that 0.125 inch thick×1.375 inch wide×12 inch long (0.32 cm×3.5 cm×30.5 cm) plywood, available from Hutton Woodworking, London, Ontario, Canada, 0.045 inch thick×1.5 inch wide×12 inch long (0.11 cm×3.8 cm×30.5 cm) phosphate coated steel (CRS), available from Advanced Coatings Technologies, Hillsdale, Mich., or 0.125 inch thick×1.375 inch wide×12 inch long (0.32 cm×3.5 cm×30.5 cm) acrylonitrile-butadiene-styrene (ABS), available from Parker Plastics, London, Ontario, Canada, in place of the second piece of twill.

The test sample is clamped into the jaws of an INSTRON Model 4400R tensile testing machine, using Series IX software, and tested at a crosshead speed of 2 inches (50 mm) per minute for a distance of about 3.5 inches (8.9 cm). The force required to peel back the fabric (in a direction 180° to the bond line) is recorded in pounds per inch width (piw) and converted to kiloNewtons per meter (kN/m). The reported value in the Tables is the average of two replicates for each composition tested.

180° Peel Strength after Environmental Exposure, Substrate to Twill

In this test, the effectiveness of bonding of a composition is compared for various substrates bonded to cotton twill after exposure to an elevated temperature of 126° F. (52° C.) and 80% RH for 48 hours.

The steel/twill test samples after being used for determining "Room Temperature, 180° Peel Strength, Substrate to Twill" above, are utilized for determining peel strength after exposure to hot, moist conditions.

The test samples are put in an environmental chamber at 126° F. (52° C.) and 80% RH for 48 hours. The samples are removed from the chamber and conditioned at room temperature for 24 hours.

Each of the test samples is then tested using the procedure of the test method "Room Temperature, 180° Peel Strength, Substrate to Twill".

Time Based Storage Modulus (G') by Dynamic Mechanical Analysis (DMA)

A wet film of adhesive composition or polymer is cast onto a polyester film. The adhesive film on the polyester film is dried at room temperature for 20 hours, then placed in an air circulating oven at 194° F. (90° C.) for 30 minutes, conditioned at ambient temperature for up to 24 hours, followed by 131° F. (55° C.) for a minimum of 30 minutes. The sample is removed from the oven, the polyester film is stripped off, and the dried adhesive film is immediately tested using a Rheometrics brand DMA. Measurement is made at various time intervals and at 1 Hertz (Hz) from initial to final value (constant value). The percent increase in G' over the initial (i.e., 0 minutes) is calculated and reported for each time interval. The maximum G' value obtained is also reported. It is desirous that G' reaches its maximum value in the minimum time.

Examples 1–3

In these examples, the effect of varying the amount of total resin component in the compositions of the invention is demonstrated.

Three adhesive compositions of the invention were prepared by combining in the components of Table 1 in the following order: DEP170, RM1020, A310S, DT50, Ol640, Trisamino, and P200. In addition to the components listed in Table 1, each composition contained 100 parts DEP170.

TABLE 1

| Component | Phr Based On 100 Parts By Weight DEP170 | | |
|---|---|---|---|
| | Ex. 1 | Ex. 2 | Ex. 3 |
| DT50 | 20 | 25 | 17.51 |
| A310S | 8 | 10 | 5.50 |
| Ol640 | 1.72 | 2.16 | 1.65 |
| P200 | 1.65 | 2.02 | 1.59 |
| Trisamino | 1.62 | 2.02 | 1.56 |
| RM1020 | 0.17 | 0.24 | 0.17 |

The adhesive compositions were tested at various open times for foam to fabric T-Peel Strength at room temperature (RT) and after environmental exposure (ENV) according to the test methods outlined above. The open time and T-Peel Strength rating results are given the Table 2.

TABLE 2

| Ex. No. | Open Time, Hours | T-Peel Strength Rating | |
|---|---|---|---|
| | | RT | ENV |
| 1 | 2 | 5 | 4 |
| | 4 | 4.9 | 3.8 |
| | 24 | 4.9 | 4.3 |
| | 72 | 4.8 | 3.9 |
| 2 | 2 | 3.5 | 2 |
| | 4 | 3.5 | 3.5 |
| | 24 | 3.5 | 3 |
| | 72 | 3.5 | 2 |
| 3 | 2 | 5 | 4 |
| | 4 | 5 | 4 |
| | 24 | 5 | 4 |
| | 72 | 5 | 4.5 |

Examples 4–5

In these examples, the effect of varying the amount of rheology modifying component in the compositions of the invention is demonstrated.

Two adhesive compositions of the invention were prepared according to Examples 1–3 above using the components and amounts of Example 1 except that amount of RM1020 in Example 4 was 0.093 phr and there was no RM1020 in Example 5.

The adhesive compositions were tested as in Examples 1–3. The open time and T-peel Strength rating results are given the Table 3. The results obtained for Example 1 (which contained 0.17 phr of RM 1020) are repeated below.

TABLE 3

| Ex. No. | Open Time, Hours | T-Peel Strength Rating | |
|---|---|---|---|
| | | RT | ENV |
| 1 | 2 | 5 | 4 |
| | 4 | 4.9 | 3.8 |
| | 24 | 4.9 | 4.3 |
| | 72 | 4.8 | 3.9 |
| 4 | 2 | 5 | 2.5 |
| | 4 | 4 | 2.5 |
| | 24 | 4.5 | 3.5 |
| | 72 | — | — |
| 5 | 2 | 4.5 | 2.5 |
| | 4 | 3.5 | 2 |
| | 24 | 5 | 3 |
| | 72 | — | — |

Example 6–7

In these examples, the effect of varying the amount of stabilizer component in the demonstrated.

Two adhesive compositions of the invention were prepared according to Examples 1–3 above using the components and amounts of Example 1 except that amount of P200 in Example 6 was 1.41 phr and the amount of P200 in Example 7 was 1.92 phr.

The adhesive compostions were tested as in Examples 1–3. The open time and T-Peel Strength rating results are given the Table 4. The results obtained for Example 1 (which contained 1.65 phr of P200) are repeated below.

TABLE 4

| Ex. No. | Open Time, Hours | T-Peel Strength Rating | |
|---|---|---|---|
| | | RT | ENV |
| 1 | 2 | 5 | 4 |
| | 4 | 4.9 | 3.8 |
| | 24 | 4.9 | 4.3 |
| | 72 | 4.8 | 3.9 |
| 6 | 2 | 4 | 2 |
| | 4 | 4 | 3 |
| | 24 | 5 | 3 |
| | 72 | — | — |
| 7 | 2 | 5 | 4 |
| | 4 | 5 | 3 |
| | 24 | 5 | 4 |
| | 72 | — | — |

Examples 8–9 and Comparative Example C-1

In these examples, the effect of using a blend of polyester urethane components and the effect of using a blend of acrylic ester polymer components in the compositions of the invention is demonstrated.

Two adhesive compositions of the invention were prepared by combining the components of Table 5 in the order described in Examples 1–3. In addition to the components listed in Table 5, each composition contained 100 parts DEP170; Example 8 contained no DEP172; and Example 9 contained 25 parts DEP172. Comparative Example C-1 was Cegex™, a polyester urethane water based adhesive, pH 7.59, % solid content 44.36, available from Cegex Systems, Albias, France.

TABLE 5

| | Phr Based On 100 Parts By Weight DEP170 & DEP172 | |
|---|---|---|
| Component | Ex. 8 | Ex. 9 |
| CA597 | 20 | — |
| DT50 | — | 20 |
| A310S | 8 | 8 |
| Ol640 | 1.72 | 1.72 |
| P200 | 1.65 | 1.65 |
| Trisamino | 1.62 | 1.62 |
| RM1020 | 0.17 | 0.17 |

The adhesive compositions and Comparative Example C-1 were tested as in Examples 1–3. The open time and T-Peel Strength rating results are given the Table 6.

TABLE 6

| | | T-Peel Strength Rating | |
|---|---|---|---|
| Ex. No. | Open Time, Hours | RT | ENV |
| 8 | 2 | 3.5 | 4 |
| | 4 | 3.5 | 3.5 |
| | 24 | 3.5 | 4.5 |
| | 72 | 5 | 5 |
| 9 | 2 | 4.5 | 3 |
| | 4 | 4 | 3.5 |
| | 24 | 3.5 | 4 |
| | 72 | 4 | 4 |
| C-1 | 2 | 5 | 3 |
| | 4 | 5 | 3 |
| | 24 | 5 | 2.5 |
| | 72 | 5 | 2 |

In addition, Examples 1, 8, 9, and Comparative Example C-1 were tested for 180° peel strength at room temperature and after environmental exposure of various substrates to twill, T-peel strength at room temperature and after environmental exposure of twill to twill bonds, heat resistance of twill to twill bonds, and time based storage modulus. The latter test also include Comparative Example C-2 (DEP170 neat). The test methods used are those described herein above. Test results are given in Table 7 (peel strength), Table 8 (heat resistance) and Table 9 storage modulus).

TABLE 7

| | | | Peel Strength, piw (kN/m) | |
|---|---|---|---|---|
| Ex. No. | Test | Test Substrates | RT | ENV |
| 1 | 180° Peel | Twill/plywood | 12.8 (2.2) | 19.8 (3.5) |
| | | Twill/CRS | 5.1 (0.90) | 20.6 (3.6) |
| | | Twill/ABS | 10 (1.8) | 18.7 (3.3) |
| | T-peel | Twill/twill | 18.7 (3.3) | — |
| 8 | 180° Peel | Twill/plywood | 7.3 (1.3) | 19.8 (3.5) |
| | | Twill/CRS | 9.0 (1.6) | 21.3 (3.7) |
| | | Twill/ABS | 17.8 (3.1) | 21.1 (3.7) |
| | T-peel | Twill/twill | 11.1 (1.9) | — |
| 9 | 180° Peel | Twill/plywood | 8.5 (1.5) | 22.3 (3.9) |
| | | Twill/CRS | 10.9 (1.9) | 20.6 (3.6) |
| | | Twill/ABS | 17.3 (3.0) | 22.9 (4.0) |
| | T-peel | Twill/twill | 12.2 (2.1) | — |

TABLE 7-continued

| | | | Peel Strength, piw (kN/m) | |
|---|---|---|---|---|
| Ex. No. | Test | Test Substrates | RT | ENV |
| C-1 | 180° Peel | Twill/plywood | 13.8 (2.4) | 13.9 (2.4) |
| | | Twill/CRS | 12.6 (2.2) | 12.1 (2.1) |
| | | Twill/ABS | 3.7 (0.65) | <1 (<0.18) |
| | T-peel | Twill/twill | 9.2 (1.6) | 8.8 (1.5) |

TABLE 8

| | Heat Resistance Bond Separation, Inches (mm) | | | |
|---|---|---|---|---|
| Ex. No. | At 40° C. | At 45° C. | At 50° C. | At 55° C. |
| 1 | 0 (0) | 0 (0) | 2.56 (65) | — |
| 8 | 0 (0) | 0.08 (2) | 0.47 (12) | 2.76 (70) |
| 9 | 0 (0) | 0.08 (2) | 2.28 (58) | — |
| C-1 | 0 (0) | 0.67 (17) | 2.83 (72) | — |

TABLE 9

| | Time Based G', % Increase | | |
|---|---|---|---|
| Ex. No. | 2 minutes | 5 minutes | Max. G' × $10^7$ |
| 1 | 74 | 375 | >7.0 |
| 8 | 333 | 989 | 4.8 |
| 9 | 88 | 805 | 8.9 |
| C-1 | 75 | 406 | >6.0 |
| C-2 | 265 | 944 | >4.8 |

The data in the Table 9 above demonstrates the rapid rate of green strength (initial strength) build up, after heating, of the adhesive compositions of the invention.

Example 10

In this example, the stability of adhesive compositions of the invention at elevated temperatures was determined by measuring the pH at various time intervals.

The adhesive compositions of Examples 1–9, each composition prepared at approximately 50% solid content, were tested for elevated temperature stability according to the test method "Elevated Temperature Stability" previously described. The composition of Example 1 was prepared four times and is presented in Table 10 as Examples 1a, 1b, 1c, and 1d.

The time intervals, pH, and % coagulation results are in Table 10 below.

TABLE 10

| Ex. No. | pH, % Coagulation | | | | | | | | | |
|---|---|---|---|---|---|---|---|---|---|---|
| | 0 wk | 1 wk | 3 wks | 5 wks | 6 wks | 7 wks | 8 wks | 9 wks | 10 wks | 11 wks |
| 1a | 8.92 | — | 8.56 | — | 7.91 | — | — | — | 7.56 50% | — |
| 1b | 8.9 | — | 8.26 | 7.88 | — | 7.46 | — | — | — | 6.78 60% |
| 1c | 8.81 | 8.51 | 8.16 | 7.78 | — | — | — | 7.25 50% | — | — |
| 1d | 8.83 | 8.55 | 8.23 | 7.79 | — | — | — | 7.2 50% | — | — |
| 2 | 8.95 | 8.66 | 8.34 | 7.99 | — | — | — | 7.6 50% | — | — |
| 3 | 8.83 | 8.6 | 8.27 | 7.85 | — | — | — | 7.21 50% | — | — |
| 4 | 8.9 | — | 8.26 | 7.89 | — | 7.41 | — | — | — | 6.82 60% |
| 5 | 8.91 | — | 8.28 | 7.93 | — | 7.5 | — | — | — | 6.93 60% |
| 6 | 8.94 | — | 8.29 | 7.92 | — | 7.41 | — | — | — | 6.85 60% |
| 7 | 8.96 | — | 8.36 | 8.01 | — | 7.6 | — | — | — | 6.98 60% |
| 8 | 8.02 | 7.83 | 7.64 | 7.32 | — | — | — | 6.77 60% | — | — |
| 9 | 8.83 | 8.6 | 8.29 | 7.9 | 7.9 | 7.9 | 7.9 | 7.14 60% | — | — |

This invention may take on various modifications and alterations without departing from the spirit and scope thereof. Accordingly, it is to be understood that this invention is not to be limited to the above-described, but it is to be controlled by the limitations set forth in the following claims and any equivalents thereof. It is also to be understood that this invention may be suitably practiced in the absence of any element not specifically disclosed herein.

What is claimed is:

1. A low temperature thermally activatable water-dispersed adhesive composition comprising:
    low modulus crystallizing polyester polyurethane;
    acrylic ester copolymer;
    thermoplastic resin selected from the group comprising terpene-phenolics, rosin esters, acrylate-acrylonitrile copolymers, acrylate-styrene-acrylonitrile terpolymers, and combinations thereof;
    one or more hydrophobically-modified associative polyurethanes; and
    a stabilizer system comprising a combination of carbodiimide and branched primary amino alcohol.

2. The low temperature thermally activatable water-dispersed adhesive composition of claim 1 wherein the acrylic ester copolymer is present in the composition in an amount of from about 2 to about 15 parts per 100 parts low modulus crystallizing polyester polyurethane on a dry weight basis.

3. The low temperature thermally activatable water-dispersed adhesive composition of claim 1 wherein the thermoplastic resin is present in the composition in an amount of from about 10 to about 30 parts per 100 parts low modulus crystallizing polyester polyurethane on a dry weight basis.

4. The low temperature thermally activatable water-dispersed adhesive composition of claim 1 wherein the one or more hydrophobically-modified associative polyurethanes is present in the composition in an amount of from about 0.05 to about 2.0 parts per 100 parts low modulus crystallizing polyester polyurethane on a dry weight basis.

5. The low temperature thermally activatable water-dispersed adhesive composition of claim 1 wherein the carbodimide and the branched primary amino alcohol are each present in the composition in an amount of from about 1.0 to about 3.0 parts per 100 parts low modulus crystallizing polyester polyurethane on a dry weight basis.

6. The low temperature thermally activatable water-dispersed adhesive composition of claim 1 wherein the acrylic ester copolymer comprises a copolymer of butyl acrylate and methyl methacrylate.

7. The low temperature thermally activatable water-dispersed adhesive composition of claim 1 wherein the thermoplastic resin is terpene-phenolic resin.

8. The low temperature thermally activatable water-dispersed adhesive composition of claim 1 wherein the carbodiimide is selected from the group consisting of water dispersions of the reaction product of tetramethylxylene diisocyanate, 2,4,6-tris(1-methylethyl)-1,3-phenylene), tetraisopropyldiphenylcarbodiimide, and combinations thereof.

9. The low temperature thermally activatable water-dispersed adhesive composition of claim 1 wherein the branched primary amino alcohol is selected from the group consisting of 2-amino-1-butanol; 2-amino-2-methyl-1,3-propanediol; 2-amino-2-methyl-1-propanol; 2-amino-2-ethyl-1,3-propanediol; tris(hydroxymethyl)aminomethane, and combinations thereof.

10. The low temperature thermally activatable water-dispersed adhesive composition of claim 1 wherein the low modulus crystallizing polyester polyurethane has a storage modulus (G') at 25° C. to about $1 \times 10^8$ or about $1 \times 10^9$ dynes/cm$^2$ as measured by DMA at a frequency of 1 Hertz.

11. The low temperature thermally activatable water-dispersed adhesive composition of claim 1 further comprising an antioxidant.

12. A low temperature thermally activatable adhesive comprising a mixture of:
    low modulus crystallizing polyester polyurethane;
    acrylic ester copolymer;
    thermoplastic resin selected from the group consisting of terpene-phenolics, rosin esters, acrylate-acrylonitrile copolymers, acrylate-styrene-acrylonitrile terpolymers, and combinations thereof;

one or more hydrophobically-modified associative polyurethanes; and a stabilizer system comprising a combination of carbodiimide and branched primary amino alcohol.

13. The adhesive of claim 12 wherein the adhesive has an open time of at least 24 hours.

14. The adhesive of claim 12 in the form of a self-supporting film.

* * * * *